United States Patent [19]

Klein et al.

[11] 3,993,716

[45] Nov. 23, 1976

[54] ACRYLATE COMPOSITIONS

[75] Inventors: Dieter H. Klein, Clute; Russell H. Cramm, Lake Jackson, both of Tex.

[73] Assignee: Dow Badische Company, Williamsburg, Va.

[22] Filed: Sept. 22, 1970

[21] Appl. No.: 74,472

[52] U.S. Cl. ........................ 260/885; 260/29.6 RB; 260/33.6 UA; 260/881; 260/882; 260/883; 260/884; 260/886
[51] Int. Cl.$^2$ .................. C08L 31/00; C08L 51/00
[58] Field of Search ............ 260/885, 881, 33.6 UA, 260/29.6 RB

[56] References Cited
UNITED STATES PATENTS

| | | | |
|---|---|---|---|
| 3,317,635 | 5/1967 | Osmond | 260/881 |
| 3,476,388 | 10/1969 | Yocum | 260/78.4 |
| 3,480,601 | 11/1969 | Ashby et al. | 260/86.1 |

Primary Examiner—Ronald W. Griffin
Attorney, Agent, or Firm—Plumley and Tyner

[57] ABSTRACT

The formation of non-aqueous polymeric dispersions, solutions, hydrosols and collodial suspensions by polymerizing vinyl monomers (A) in a hydrocarbon medium containing dissolved therein a stabilizing component (B) comprising an acrylic polymer previously formed from acrylic monomers (E). The invention comprises use, in (B), of minor proportions of (2-(1-aziridinyl)-ethyl- methacrylate to provide, by reason of its high reactivity, higher molecular weight backbones (B) and simultaneously by reason of its high functionality, to provide active sites for grafting side chains onto backbone (B). Furthermore, the reactivity thereof can make the final product self-cross-linking. The above system produces a dispersion of a vinyl polymer (C) formed from the polymerized vinyl monomers (A) in the hydrocarbon medium wherein a modified stabilizer (D) is formed either in situ from a precursor or in a preliminary separate step by grafting a portion of the vinyl monomers (A) onto the soluble polymeric stabilizer backbone (B). It is possible to produce thermosetting emulsions of graft copolymers or lacquers of the graft copolymers. The stabilized acrylic copolymers thus resulting can be used for many coating purposes in view of their self-cross-linking and internal plasticization properties.

4 Claims, No Drawings

ACRYLATE COMPOSITIONS

This invention relates to stable vinyl-type coating compositions containing a stabilizer graft copolymer, more particularly acrylic graft copolymers. Specifically, the invention is designed to provide coating compositions which may be used in the form of lacquers, solutions, dispersions, hydrosols, or emulsions of vinyl polymers especially acrylic copolymers which are in their dispersion or colloid form stabilized by a novel acrylic graft copolymer.

PRIOR ART

In the prior art, the process of preparing dispersions of vinyl polymers containing a dissolved polymeric stabilizing component is known. It is further known that acrylic and methacrylic copolymers can be used as the dissolved stabilizer in hydrocarbon media. It is also known that when vinyl monomers are polymerized to vinyl polymers in the presence of the dissolved acrylic-type stabilizers, some in situ grafting of vinyl monomers to the acrylic copolymer backbone will occur. From this knowledge it is known how to use acrylic graft copolymer stabilizers either in the preformed state or as precursors with in situ grafting to yield stable dispersions of the insoluble vinyl polymers. In both cases the vinyl monomers are polymerized in the organic media which already contains the acrylic stabilizer either as precursor or as preferred graft copolymer. However, it is preferred to use the preformed acrylic stabilizer, since the stability of these compositions is generally improved over the precursor system. Theoretically, the explanation of the stability of vinyl compositions containing acrylic graft copolymers is that the backbone of the dissolved acrylic graft polymer remains dissolved in the hydrocarbon medium but the side chains being essentially vinyl polymers are not dissolved. These side chains are, however, miscible with the main vinyl polymers and, therefore, are able to disperse them in the hydrocarbon media. In addition to the lack of stability in the prior systems, the prior art compositions suffer from the disadvantage of requiring an external plasticizer and of requiring an external cross-linking agent in order to form useful paints etc. Furthermore, the ultimate coating is frequently soft, inflexible, non-adhesive, easily marred, and solvatable.

SUMMARY OF THE INVENTION

This invention provides vinyl polymer compositions containing acrylic graft copolymers as stabilizer wherein the compositions are more stable, and are self-plasticizing and by selecting appropriate monomers adapted to make self-crosslinkable compositions. Additionally, in their collodial form (including hydrosols), they show improved properties as coatings. These advantages are achieved by use of a novel and determinative monomer in the backbone of the stabilizer which monomer comprises (2-(1-aziridinyl)-ethyl-methacrylate.

An important advantage of this invention is the ability to form higher molecular weight, more stable, and higher solids content dispersions by use of the dispersion polymerization technique. This is achieved by balancing the charges in the system. By use of (2-(1-aziridinyl)-ethyl-methacrylate the stabilizer backbone is basically charged. But by controlling the subsequently grafting composition it is possible to produce a net stabilizer charge that is either basic or acidic. This charge is determined by the type of vinyl polymer desired as the coating composition per se. Thus, if an acrylic precursor (backbone only containing the basic charge) is graft copolymerized with a mixture of vinyl monomers especially acrylates (methyl methacrylate, lauryl methacrylate as the vinyl polymer components) and a small amount of a monomer whose functional group is either proton donating, especially a copolymerizable carboxylic or hydroxylic monomer (acrylic acid, methacrylic acid, maleic anhydride itaconic acid, crotonic acid, fumaric acid), or proton accepting, especially a copolymerizable primary, secondary, or tertiary amine (2-dimethylaminoethyl methacrylamide, t-butylaminoethyl methacrylate, dimethylaminoethyl methacrylate, N-vinyl-2-pyrrolidone), a stable nonaqueous copolymer dispersion can be made. The critical proton donating or accepting monomer guarantees an amphiphatic balance and the functional group serves as an absorbant, reactant, or promotes association of the stabilizer onto the polymer particles. Alternatively if a preformed stabilizer is used then the backbone has already been reacted during the opening of the aziridinyl ring with either the proton donating or accepting monomer and the vinyl monomers may be as noted above with an additional basic or acidic monomer added to neutralize the stabilizer charge and promote dispersability.

Electric charges are generated on particles suspended in hydrocarbons by acidic or basic polar polymers or micelle forming substances. The charging process involves dissociation at the interface, donation of protons by acidic particles to basic dispersants (or by acidic dispersants to basic particles) and subsequent diffusion of the oil soluble ion beyond the plane of shear so that opposite charges result on the particle and in the liquid.

The acidic or basic nature of vinyl polymer particle surfaces influences very strongly the effectiveness of the stabilizer(dispersant) activity and thus affects the usefulness of the ultimate coating composition. The following table summarizes the effect on particle size and viscosity of an acidic dispersant versus a basic dispersant in a thermosetting copolymer dispersion.

THE EFFECT OF A BASIC VS. AN ACIDIC STABILIZER ON DISPERSION VISCOSITY AND PARTICLE SIZE

| Type of Stabilizer | Dispersion Viscosity | Particle Size |
|---|---|---|
| Basic | 150 cps | $0.1 - 0.5\mu$ |
| Acidic | Thixotropic | $<1.5\mu$ clusters |

The system studied in the preceding table is a nonaqueous dispersion containing a hydroxypropyl acrylate, ethyl acrylate, and methyl methacrylate copolymer as the "vinyl polymer". The commercial hydroxypropyl methacrylate used contains acrylic acid as an impurity and, therefore, charges the copolymer particles acidic. Because like charges repel the effectiveness of the acidic dispersant to stabilize the acidic charged polymer particles was reduced thus causing the thixotropic nature. In other words, basic dispersants are needed for acidic particles and vice versa.

Because it is possible and preferable now to incorporate acrylates in vinyl polymer-type coating compositions, dispersions can be so designed that the polymer forms a continuous film at room temperature of improved properties. By reducing the amount of methacrylates and by increasing the amount of acrylates (acrylates are better plasticizers) of the vinyl polymer composition to be dispersion polymerized, film forming polymers at room temperature can be designed, e.g. a copolymer consisting of methyl methacrylate and butyl methacrylate at a ratio of 40:60 in a thermosetting dispersion does not form a film at room temperature. However, a 40/60 methyl methacrylate/ethyl acrylate composition will form a non-aqueous dispersion where the discontinuous phase is a liquid and will form a clear and continuous as well as a flexible and tack-free film at room temperature. Nonaqueous dispersions containing a liquid continuous phase are by far more compatible with pigments and the addition of specially designed wetting agents is not necessary. Pigmentation of non-aqueous dispersions containing rigid particles is more complex and special acrylic based wetting agents are necessary to adapt prior art compositions to receive pigments.

The (2-(1-aziridinyl)-ethyl-methacrylate) illustrated below is essential in the stabilizer backbone. The compound hereinafter referred to as (Az)

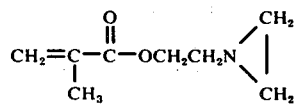

is highly reactive and can be polymerized by free radical methods through the vinyl group, or by ionic methods through the aziridine ring.

Previously used monomers in the stabilizer for vinyl compositions contained only an unsaturated vinyl group. The Compound (Az) of this invention is considerably more reactive than the previously used monomers and can be ionically polymerized by addition of small amounts of acid or other proton donor. Thus, the polymers formed by use of this reactive monomer are of higher molecular weight than prior polymers. By reason of the increased number of reactive sites, it is available for crosslinking and thus assists in avoiding the necessity of adding an external crosslinking agent to the total composition.

In formation of the backbone (precursor) the acrylic monomer combines with (Az) leaving the aziridinyl group closed.

(II)

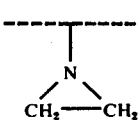

However, when the proton donating or proton accepting group containing monomer is added, the ring opens and the side-chain may then be grafted onto the unsaturation in the added monomer: e.g. if acrylic acid is added (a proton donor) the neutralized backbone which results is:

(IIA)

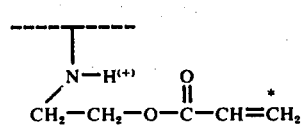

*grafting sites.

which forms a precursor stabilizer, or if an amine is added, e.g. ethylamino methacrylate (IIB)

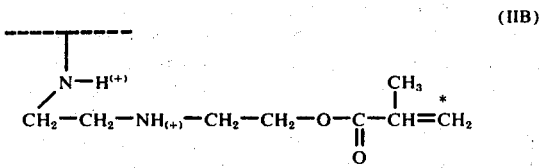

*grafting sites.

another type of stabilizer (precursor stabilizer) may be formed.

The preferred method of preparation is to use the ring opened backbone precursor with side-chains (vinyl e.g. acrylic monomers) already grafted thereon, (this is what is termed a preformed stabilizer) in an organic solvent. It is also possible to add the above polymers IIA or B to the solvent (this is use of a precursor). Either way the coating composition is formed by dispersion (emulsion) polymerization in the presence of said stabilizer and by balancing the charges on the stabilizer and vinyl polymer, a stable improved coating composition results.

Use of the Compound (Az) provides higher molecular weight acrylic graft copolymer stabilizers which retain sites for self-crosslinking, that form more stable dispersions, and that avoid the necessity for use of external plasticizers. In addition to the above noted advantages other advantages are achieved, namely, better wetability of pigments results, higher molecular weight compositions of acceptable viscosity, flexibility, hardness, and resistance result. Also non-toxic solvents can be used in the preparations.

SPECIFICS OF THE INVENTION

The vinyl compositions containing new acrylic graft copolymer stabilizers are produced by either the formation of a preformed stabilizer which is present during vinyl polymerization, or by use of a precursor (acrylic backbone) which is present during vinyl polymerization to simultaneously produce an acrylic graft copolymer stabilizer.

Since the monomers used to form the various components of the compositions are similar, they will be designated as follows for purposes of this invention
  A. vinyl monomers used to form the insoluble vinyl polymer;
  B. acrylic copolymer used as the soluble backbone of the stabilizer;
  C. the insoluble vinyl polymer resulting from polymerization of (A);
  D. the partially soluble acrylic graft copolymer resulting from grafting part of (A) onto (B);
  E. acrylic and/or methacrylic monomers used to form the soluble backbone polymer (B).

The term "vinyl" monomer as herein used especially regarding (A) and as used in the art, includes ethylenically unsaturated monomers which, though not of vinyl structure in the strict sense, polymerize according to the vinyl polymerization mechanism, for example, monomers which are vinylidene or ethylenic monomers but which are polymerized in the vinyl manner, as well as doubly unsaturated monomers such as butadiene, are within the term. Particularly preferred monomers A are acrylic acid, acrylates and methacrylates of alkanols, or glycols preferably with 1–22 carbon atoms, e.g.

methyl methacrylate, butyl methacrylate, hydroxyethyl or propyl methacrylate or hydroxybutyl acrylate. Other monomers include lower alkyl acetates, styrene, vinyl chloride, acrylonitrile vinyl acetate, vinyl propionate, acrylamides, vinylidene chloride; the compound (I) above can be used as can amine methacrylimides and methacrylic acid, as well as methylol acrylamide and tri-lower-alkyl amine-methacrylimides, e.g. trimethylamine - , 1,1-dimethyl 1(2-hydroxypropyl)amine, and 1,1-dimethyl 1(2,3-dihydroxypropyl) amine-methacrylimides. Mixtures of these are preferred and in such mixtures the proportions will vary considerably with the intended use, but generally less than 5% of the acidic and hydroxy substituted monomers is used (since generally a neutral or slightly basic stabilizer is used).

The component "B" is formed from monomers E. "B" is a random copolymer, solvatable in non-toxic hydrocarbon media. To form such a component, monomers E may be equated to the vinyl monomers (A) noted above, but must include the compound (Az) in quantities of 0.6–5%. "B" should further comprise at least about 90% of a fatty acrylate or methacrylate (E) such as lauryl or stearyl methacrylate or octyl, 2-ethyl hexyl or hexyl methacrylate (in order to be soluble in organic solvents). In addition to these aliphatic compounds, aromatics such as styrene or vinyl toluene can be (E). Also vinyl stearate, fatty alcohols and maleic or itaconic esters should be mentioned as (E) and hydroxy lower alkyl acrylates, hydroxy lower alkyl methacrylates, methylol acrylamide, and methylol methacrylamide.

The component (C) is, of course, the polymer or copolymer formed from monomers (A). This component can be present in coating compositions at up to about 70% solids. Generally, further increased solids make the composition too highly viscous, but stability will improve at high solids. Component C is preferably a random copolymer as noted above. One preferred polymer comprises 30–85% methyl methacrylate, 20–70% butyl or ethyl acrylate, 0–5% proton donor or acceptor, and optionally as an additional monomer, either 15% hydroxypropyl methacrylate, 20–25% acrylonitrile, 10% of an amine methacrylimide or about 7½% glycidyl methacrylate or methyloyl acrylamide, or their equivalents at about the same percent. The hydroxy substituted and other optional monomers can be eliminated but in this invention an advantage is that the hydroxy substituted monomer can be used without undesirably modifying the stability of the polymer because of the higher molecular weights and basic charges achieved in B via use of (Az). In prior art compositions, it was necessary to exclude such hydrophilic monomers in order to get workable non-aqueous compositions. Furthermore, carboxy containing monomers are often preferred in this invention. By inclusion thereof in (A) and/or (B) of this invention, it is now possible to crosslink, via the carboxy group, both the backbone B and at the side-chains of (D). The N—H in the open aziridinyl group serves as a cross-linking site and some crosslinkage is thus achieved with the carboxy group. However, if hydroxy groups are present, it may be necessary to add cross-linking agents. Satisfactory agents include resins of high hydrocarbon tolerance in the range of 50–200 such as butylated melamine-formaldehyde, urea-formaldehyde resins, or Polymers containing isocyonate or blocked isocyonate groups. This gives internal strength, toughness, and flexibility to the coating, especially when the component (D) is present at over 5% solids in the coating composition. As noted above in the choice of monomers A for use in dispersion systems, it is possible to pick monomers to give the vinyl polymer particles an acidic or basic charge and achieve the right balance of charges.

D is, of course, backbone B with random copolymer segments C grafted at the grafting sites on Compound (Az). By varying the mass ratio of preformed graft polymer (D) to vinyl polymer (C), it is possible to vary the properties of the ultimate composition.

It is possible to make thermosetting compositions by decreasing the relative amount of sidechains or it is possible to make lesser molecular weight compositions suitable for use as lacquers, by increasing that amount. D comprises preferably, 3–25% of total solids in the coating compositions. In the use of a preformed graft copolymer, the individual components are, for B preferably 2–5 parts (Az) per 95–98 parts fatty acrylate or methacrylate, and for sidechains preferably 0–58 parts methylmethacrylate (or methylacrylate) for about 40–98 parts lauryl methacrylate (or laurylacrylate) and about 2–30 parts proton donor e.g. methacrylic acid, fumaric acid, crotonic acid, acrylic acid, maleic anhydride and/or maleic acid, itaconic acid and/or itaconic anhydride or 2–100 parts of proton acceptor (Az), 2-dimethyl aminoethyl methacrylamide, t-butylaminoethyl methacrylate dimethylaminoethyl methacrylate, N-vinyl-2-pyrrolidone.

In choosing the amount of proton donor the ratio of soluble to insoluble monomers in the side-chain composition is determinative; thus, a proton donor is used at about 5–30% by weight of the side-chain composition and when little or no insoluble monomer (e.g. MMA) is used a maximum (20–30%) proton donor is used. However, if a proton acceptor is used, there is no limit on the proportion and the side-chain can be 100% of such monomer.

In the dispersion polymerization, non-toxic solvents can be used which is an added advantage in view of anti-pollution laws. Such solvents are those non-toxic solvents which boil at 50°–300° C.

This invention is adapted to produce colloids (organic systems), solutions, lacquers, dispersions and hydrosols (aqueous colloids) via the non-aqueous dispersion route. The non-aqueous dispersion (NAD) resulting can be used, per se, or added improvements can be achieved by using collodial systems. To form such systems the technique involves removing the solvent used in the dispersion polymerization to form about 70% solids. If a hydrosol is to be formed, a preliminary addition of about 5–10%, preferably 3%, based on the weight of C and D, of a carboxylic acid is added. After stripping solvent a coupling solvent is added, this is defined as a solvent or mixture thereof which is compatible with both the polymer C and the solvent to be added to make a colloid (water in case hydrosols are being made). Examples are given hereinafter. This addition is made to form about 50–60% solids (C) in the system. Also in the case of hydrosols, it is necessary to add a neutralizing agent for the added acid (e.g. a tertiary amine) prior to addition of the water.

In all such uses the stabilizer D is inherently associated with polymer C but is present at low weight percents and serves in ultimate use as a stabilizer for the coating composition only when the dispersion is used, per se. In the collodial systems, its function is reduced by the coupling solvent. However, in all appropriate systems, it serves as a self-crosslinking agent and internal plasticizer.

As noted above, the non-aqueous dispersion technique is used to make hydrosols and colloids. The NAD technique uses non-toxic hydrocarbon diluents in which the monomers are polymerized, forming large polymer particles of high molecular weight.

The conversion from monomer to polymer in non-aqeuous dispersion polymerization takes place more rapidly than in solution polymerization; namely, five hours versus ten hours.

By post addition of polar solvents the particles break down to smaller particles and a colloid can be formed.

The total diluent composition should contain at least 65–90% poorly hydrogen bonded, 0–35% strongly hydrogen bonded and/or moderately hydrogen bonded solvents. Some of the solvents which may be used in this invention are summarized on the following table:

| SOLVENT | SOLUBILITY PARAMETER γ | HYDROGEN BONDING INDEX δ | CLASSIFICATION |
|---|---|---|---|
| Hexane | 7.3 | 2.1 | |
| Isopar E (Isooctane) | 7.1 | 2.5 | |
| VM&P Naphtha | 7.6 | 2.5 | Poorly Hydrogen Bonded |
| High boiling aromatics | 8.5 | 2.5 | |
| Toluene | 8.9 | 3.3 | |
| Xylene | 8.8 | 3.5 | |
| Ethyl Acetate | 9.1 | 5.2 | |
| Methyl Ethyl Ketone | 9.3 | 5.4 | |
| Acetone | 10.0 | 5.9 | Moderately Hydrogen Bonded |
| Isopropyl acetate | 8.4 | 6.0 | |
| Ethylene glycol ether acetate | 8.7 | 6.5 | |
| Diacetone alcohol | 9.2 | 6.8 | |
| Ethylene glycol butyl ether | 8.9 | 7.0 | |
| Ethanol | 12.7 | 8.5 | |
| Butanol (iso) | 10.5 | 8.5 | Strongly Hydrogen Bonded |
| Butanol (n) | 11.4 | 8.5 | |
| Isopropanol | 11.5 | 8.7 | |
| $H_2O$ | None | >9.0 | |

Hydrogen bonding indexes are assigned arbitrarily and as can be seen on the preceding table may be used to classify solvents into three groups: poorly, moderately, and strongly hydrogen bonded.

However, the diluent composition for colloids should be chosen so as to meet air pollution law legislations, e.g. not more than 20% toluene or 8% xylene or 20% diisobutyl ketone, etc.

To increase the plasticization (e.g. where large amounts of non-fatty acrylates are used) external compatible plasticizers conventional in such systems can be added. Preferred plasticizers are esters of phthalic acid, e.g. cyclohexyl buty ester, dicyclohexyl ester, or benzylhexyl ester.

Other crosslink agents may be methylol acrylamide, methylol methacrylamide, and amine imide monomers as already mentioned above.

Furthermore, it is recommended that (Az) can be used as a self-crosslinking agent. Other monomers to be used are already described above which can avoid addition of external crosslinkers.

The invention is best understood by reference to the following illustrative examples:

EXAMPLE I — PREPARATION OF PRECURSOR

1. Preparation of backbone polymer

| | |
|---|---|
| 1200.0 | Isooctane |
| 686.0 | Lauryl Methacrylate |
| 14.0 | (Ar) |
| 10.0 | α(t-butylazo)isobutyl nitrile |
| 12.2 | Methacrylic Acid |
| 5.0 | Isopropylacetate |
| .4 | Hydroquinone |

2. Preparation of Copolymer (B)

The solution polymerization was carried out at 115° C for 6–8 hours.

3. Ring-opening Stage

The hydroquinone, acrylic acid, and solvent were then charged and the batch was maintained at 105° C for 3 hours. The batch had the following constants:

| | |
|---|---|
| N.V.: | 35 ± 1% |
| Acid Value: | 3.5 – 5 |
| Viscosity: | Less than A |

(In this art, the Gardner-Holdt Viscosity Scale was used. A is the lowest and Z ($Z_1$–$Z_{oo}$) is the highest viscosity. A is 0.5 stokes and Z is 22.7 stokes).

EXAMPLE IA - PREPARATION OF THE PRECURSOR

1. Summary:

A 92/5/3 copolymer of stearyl methacrylate/hydroxypropyl methacrylate/(Az) was prepared in a hydrocarbon solvent. When conversion was complete, a portion of the aziridinyl group was then esterified with acrylic acid or methacrylic acid. The polymer thus had an unsaturated sidechain upon which other monomers were grafted.

| Formula: | |
|---|---|
| 1100.0 | V.M. & P. Naphtha or Isooctane (Isopar E) |
| 644.0 | Lauryl methacrylate (LMA) |
| 35.0 | Hydroxypropyl Methacrylate (HPMA) |
| 21.0 | (Ar) |
| 10.0 | Azobisisobutyronitrile (VAZO) |

-continued

| Formula: | |
|---|---|
| 100.0 | Isopropyl Acetate |
| 15.3 | Acrylic Acid (AA) |
| 0.6 | Hydroquinone |
| 5.0 | Isopropyl Acetate |

Aliphatic hydrocarbons which are used in the invention are the best possible solvents for the system to make precursors of high molecular weights and hydrophobic nature.

2. Preparation of Copolymer (B):

The V.M.&P. Naphtha or Isooctane was charged and heated up to 115° C., the monomer feed was then metered in over a period of 4–5 hours. The temperature is maintained for a further 1½–2 hours. If necessary, a further 1 g. VAZO in 10 g. isopropyl acetate can be added to complete the reaction.

3. Ring-opening Stage:

The hydroquinone, acrylic acid, and solvent were then charged, and the batch was maintained at 95° C for 1½–2 hours.

Viscosity : Less than A
(In this art the Gardner-Holdt Viscosity Scale is used. A is the lowest and Z ($Z_1$–$Z_{00}$) is the highest viscosity. A is 0.5 stokes and Z is 22.7 stokes.)

EXAMPLE II

| Preparation of preformed graft copolymer | |
|---|---|
| 1900.0 | Backbone Polymer Solution, described under (I) |
| 526.0 | Butyl acetate |
| 153.0 | Methyl methacrylate |
| 108.0 | Lauryl methacrylate |
| 3.0 | (Az) |
| 5.4 | α(t-butylazo) isobutyl nitrile |

All the ingredients were charged and heated to 90° C and maintained at 90° C until conversion was complete.

A 98/2 lauryl methacrylate – (Az) backbone polymer was formed. The aziridinyl group was then esterified with methacrylic acid. The polymer thus had an unsaturated side chain upon which a monomer composition of methyl methacrylate, lauryl methacrylate, (Az), at a ratio of 58/40/2 was grafted in solution form. This example represents a procedure of making a basic dispersant. If the (Az) is substituted with acrylic acid or methacrylic acid for the graft copolymerization, an acidic stabilizer can be formed.

EXAMPLE III

Preparation of a thermosetting non-aqueous dispersion:

A non-aqueous dispersion of a copolymer is obtained by the emulsion copolymerization at 82° C of 210 parts of hydroxypropyl acrylate, 560 parts of methyl methacrylate, and 630 parts of ethyl acrylate in 750 parts of hexane and 518 parts of Isooctane (Isopar E) in the presence of 294 parts of the preformed graft polymer solutions of Example II, 3 parts of n-octyl mercaptan and 3 parts of azobis-isobutyronitrile.

The dispersion has a non-volatile content of 50.0% and viscosity is 130–150 centipoise.

When cast on a glass plate, a continuous film forms as soon as the diluent evaporates. The dry film is tough and flexible. If a highly butylated melamine-formaldehyde condensate is added, the film may be crosslinked at elevated temperatures.

Stable dispersions with the following vinyl polymer compositions were made by using the procedure of Example III.

EXAMPLE IV

| Methacrylic acid | acrylonitrile | ethyl acrylate |
|---|---|---|
| 1.0 | 20.0 | 26.3 |
| methyl methacrylate | | |
| 52.7 | | |

This dispersion contained rigid copolymer particles.

EXAMPLE V

| Methacrylic acid | butyl acrylate | methyl methacrylate |
|---|---|---|
| 1.0 | 20.0 | 79.0 |

EXAMPLE VI

| Methacrylic acid | hydroxypropyl acrylate |
|---|---|
| 1.0 | 15.0 |
| methyl methacrylate | ethyl acrylate |
| 40.0 | 44.0 |

This dispersion contained a liquid discontinuous phase. A film was tough, tackfree and flexible. The copolymer is an example of a thermosetting non-aqueous dispersion because the hydroxyl group coming from the hydroxy propyl acrylate can be reacted with various additives.

EXAMPLE VII

| Glycidyl methacrylate | methyl methacrylate | ethyl acrylate |
|---|---|---|
| 7.5 | 32.5 | 60.0 |

This is an example of a thermosetting non-aqueous dispersion where the glycidyl group is reactive.

EXAMPLE VIII

| Methacrylic acid | methyl methacrylate | ethyl acrylate |
|---|---|---|
| 5.0 | 35.0 | 60.0 |

The above composition was mixed at a proportion of 1:1 with the composition of Example VII and the resulting film of the mixture will self-crosslink upon baking at 300° F for 30 minutes. The esterification reaction between the glycidyl group coming from the glycidyl methacrylate and the carboxyl group coming from the methacrylic acid can be accelerated by addition of 1% (based on solids) dimethyl cocoamine. This is an example of a self-crosslinking non-aqueous dispersion. A film of the mixture can be cast, resulting in a clear film when the diluent evaporates. When baked, the film was insoluble in boiling xylene, whereas an unbaked film will dissolve. This proves that crosslink reaction took place.

EXAMPLE IX

| X | Methyl methacrylate | Ethyl acrylate |
|---|---|---|
| 10.0 | 35.0 | 55.0 | where X may be trimethylamine methacrylimide; 1,1-dimethyl-1-(2-hydroxypropyl) amine methacrylimide; or 1,1-dimethyl-1-(2,3-dihydroxypropyl) amine methacrylimide.

The aminimide monomers improved dispersion stability and the polymers are self-crosslinkable. Coatings with improved adhesion, toughness, and wettability are obtained by incorporating any of the aminimide monomers.

Baking schedule for this type of thermosetting non-aqueous dispersion is above 250° F. Because tertiary isocyanate groups are generated, strong catalysts must be used for crosslinking these with hydroxyl reactivity. Mercury solution (such as, e.g., Curithane 252 from Upjohn) has proven to be the best thermolysis catalyst for these systems.

Of particular significance is the monomer

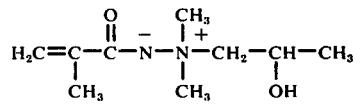

1,1-dimethyl-1-(2-hydroxypropyl) amine methacrylimide (DHA). DHA is soluble in polar solvents such as ethanol, isopropanol, chloroform and water; slightly soluble in benzene, ethyl acetate and acetone; and insoluble in carbon tetrachloride, hexane, and isooctane (Isopar E).

Because DHA is a very polar monomer and hence insoluble in hydrocarbon media, it will decrease also the solubility of a copolymer in hydrocarbons. In hydrocarbon media, polar molecules will have highest reactivity and this holds for chain transfer agents and initiators as well as monomers. Polymerization in hydrocarbons and with DHA as a comonomer increases speed of reaction so that little solution polymerization can take place. The less solution polymerization takes place, the finer will be the polymer particles and hence the dispersion will be more stable and of lower viscosity.

Furthermore, as illustrated on the structural formula of DHA, it has a negative as well as a positive charge, therefore allowing better adsorption, association, or absorption of the stabilizer onto the polymer particles which contain DHA. This may be a further reason why non-aqueous dispersions are more stable when they contain DHA.

The use of DHA makes the incorporation of monomers possible, which normally would result in low stability of the dispersion.

Hydroxypropyl methacrylate, hydroxyethyl methacrylate, hydroxyethyl acrylate, and hydroxy butyl acrylate caused dispersions to coagulate whenever solids content exceeded 25–35%. Incorporation of 5% DHA based on total solids allows the preparation of non-aqueous dispersions at 50–70% total solids which contain the above-mentioned hydroxyl functional monomers. Monomers such as styrene, butyl acrylate, and 2-ethylhexyl acrylate can be copolymerized at higher amounts if the copolymer contains at least 5% DHA. The amount of DHA is not limited and a homopolymer of DHA also can be made in hydrocarbon media.

Whenever DHA is copolymerized, it is preferred to use a basic charged stabilizer (as formed in Example II) because the basicity also catalyzes the crosslink reaction of DHA functionality above 120° C. However, an acidic charged preformed graft stabilizer may be used also to make a fairly stable non-aqueous dispersion which contains DHA but no acrylic acid or methacrylic acid should be used in the vinyl polymer. The influence of charge on stability is explained and it is noted that the vinyl polymer particles should not contain carboxyl groups if the stabilizer is negatively charged (acidic).

EXAMPLE X

| Methylol acrylamide | acrylonitrile | ethylacrylate |
|---|---|---|
| 7.5 | 25.0 | 67.5 |

This is an additional example of a self-crosslinking non-aqueous dispersion. When a film was cast and baked at 250° F for 30 minutes, the methylol groups react amongst each other. While the compositions of Examples IV-VIII may be made exactly as it is described under the experimental Example III, the composition X has to be made differently.

First, methylol acrylamide in butanol solution should be made:

a. Preparation of methylol acrylamide:

| FORMULA | |
|---|---|
| 355 g | Acrylamide |
| 825 g | Formaldehyde solution (40 % in n-butanol) |
| 7.9 g | Dimethylethanolamine or triethylamine. |

The components of the formula were mixed together and heated to 90° C under efficient agitation for 30–60 minutes. The product was cooled and filtered.

The process of making methylol acrylamide is necessary to give stable compositions.

b. Preparation of self-crosslinking non-aqueous dispersion based on methylol acrylamide A non-aqueous dispersion of a copolymer was obtained by the emulsion copolymerization at 76°–78° C of 230 parts of methylol acrylamide solution prepared under (a) above, 280 parts of acrylonitrile, 930 parts of ethyl acrylate in 750 parts of hexane and 700 parts of Isopar E in the presence of 294 parts of a basic preformed graft polymer solution, 3 parts of n-octyl mercaptan and 3 parts of azobisisobutyronitrile.

The formed dispersion forms a continuous film at room temperature and crosslinks upon baking at 250° F.

The prior art has usually employed glycidyl methacrylate (GMA) to react with acrylic acid in order to get a grafting site for later graft reactions. The substitution of (Az) for GMA has many advantages as have been pointed out. Since the acidic or basic nature of the stabilizer determines more or less the stability of the dispersion (depending on the charge of the dispersed polymer particles) the use of (Az) is even more important. For the preparation of a basic stabilizer, the use of GMA is not recommended because it is less proton accepting than (Az). When GMA reacts with an acid, it forms an ester and in addition a secondary hydroxyl group;

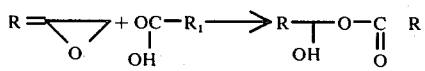

This hydroxyl group is rather acidic or at least amphoteric and, therefore, reduces basicity of the stabilizer. (Az) reacts with an acid and forms an ester group too, but in addition also forms a secondary amine group which is strongly proton accepting:

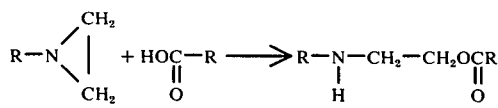

Thus, dispersants which contain (Az) disperse acidic charged polymer particles and optionally the other proton accepting groups more effectively than dispersants containing GMA. This concept is important because most acrylic based non-aqueous dispersions contain an acidic charged discontinuous phase.

To further illustrate the advantages of using (Az) the following Examples are submitted:

c. Two copolymers were made by the procedure of Example I(a) as follows:

| X | (S) Styrene | (MMA) Methyl Methacrylate | (BMA) Butyl Methacrylate |
|---|---|---|---|
| 10 | 42 | 3 | 45 | where X was GMA (glycidyl methacrylate) and (Az) both copolymers were made in solution under the same conditions. A sample of each copolymer solution was taken and 1% formic acid was added. While the (Az) containing polymer gelled 20 minutes after the formic acid was added, the viscosity of the GMA containing polymer did not change at all. This proves that polymerization of the aziridinyl group took place as soon as a small amount of a proton donor was added. The oxirane ring in GMA does not polymerize ionically under conditions at which the herein described stabilizers are formed.

d. The acid value of the hydroxypropyl methacrylate (HPMA) which was used above to form the stabilizer polymer was determined and found to be 20 mg KOH per 1 g HPMA. (The acid value comes from methacrylic acid as an impurity in the commercial HPMA). Two solution copolymerizations were run, according to Example I(a). One contained HPMA unneutralized while in the other experiment, HMPA was neutralized (Acid Number 0). The monomer composition was

| HPMA | (I) | S | BMA | MMA |
|---|---|---|---|---|
| 16 | 0.4 | 39.6 | 41 | 3 |

The experiment, where HPMA was neutralized had a viscosity of 12 stokes at 50% total solids, while the non-neutralized batch gelled. This proves small amounts of (Az) with acid impurities cause a tremendous increase in molecular weight due to ionic polymerization through the aziridinyl group and radical polymerization via the vinyl group (difunctionality). Furthermore, it proves that hydroxyl groups do not react with the aziridinyl group.

e. Two copolymerizations at 80% total solids in xylene were run according to Example I(a) under equal conditions. The composition of the copolymer was:

X/lauryl methacrylate 5/95 where X was GMA and (Az).

The (Az) containing copolymer gelled while the GMA containing copolymer had a viscosity of approximately 60 stokes.

This proves that (Az) results in higher molecular weights than GMA. Apparently, the very small acid impurities in lauryl methacrylate triggers ionic polymerization of (Az).

The above examples show the advantages of (Az) containing stabilizers over similar stabilizers. The above examples show that under equal conditions, (Az) gives higher molecular weight stabilizers than e.g. GMA. The stabilizing property of a "precursor" is molecular weight dependent, thus the molecular weight preferably should be high.

If the molecular weight of the polymer can be raised, a tougher film would result. This statement is true for the polymeric stabilizer and for the grafted sidechain. Therefore, since (Az) due to its multifunctionality causes higher molecular weights in the polymeric "precursor" backbone, overall properties of (Az) containing polymers are better.

From the above statement of the invention, it will be apparent that this invention provides novel coating compositions based on a novel backbone polymer which produce improved films whether applied as non-aqueous emulsions, dispersions, colloids [aqueous(hydrosols) and organic] suspensions or solutions.

EXAMPLE XI

To prepare a polymer with self-crosslinking properties, the following formula for preparation of a non-aqueous emulsion was used:

Backbone: HPMA/(Az)/StMA//5/3/92

Sidechain: AA/HEA/BMA/MM//2/5/10/83
Mass Ratio: 20/80

| Formula: | |
|---|---|
| 110.0 | V.M.&P. |
| 135.0 | Hexane |
| 315.0 | Polymer solution described in Example 1 |
| 44.0 | Butyl Methacrylate (BMA) |
| 22.0 | Hydroxyethyl Acrylate (HEA) |
| 8.0 | Acrylic Acid |
| 366.0 | Methyl Methacrylate (MMA) |
| 4.0 | t-Dodecyl Mercaptan |
| 3.0 | Benzoyl Peroxide |

Procedure

All ingredients were charged and heated to reflux and maintained at reflux until conversion was complete. If necessary, an additional 0.3 g. benzoyl peroxide can be added to complete conversion.

Appearance
Emulsion

Constants
N.V. 50.5%
Viscosity 50 stokes

When cast on a glass plate, a film forms as soon as the solvent evaporated. The film was baked at 300° F for 30 minutes. The film then was hard and brittle. A piece of film was then boiled in Dowanol EE Acetate and did not dissolve. This proved that crosslinking took place, because a non-baked piece of film was soluble in Dowanol EE Acetate. (This is supplied by the Dow Chemical Company and is ethylene glycol ethyl ester acetate boiling at 156°–166° C.)

EXAMPLE XII

To produce thermosetting lacquer type compositions as follows, the precursor system is used:
Backbone Polymer: HPMA/(Az)/StMA//5/3/92
Sidechain Polymer: AA/HEA/BMA/MMA//1/1/30/68
Mass Ratio: 10/90 in V.M.&P. Naphtha/ Hexane mixture at a ratio of 70/30.

| Formula: | |
|---|---|
| 250.00 | V.M.&P. Naphtha |
| 146.00 | Hexane |
| 146.00 | Polymer solution described in Example 1 |
| 133.00 | Butyl Methacrylate |
| 316.00 | Methyl Methacrylate |
| 4.50 | Hydroxy Ethylacrylate |
| 4.50 | Acrylic Acid |
| 3.00 | t-Dodecyl Mercaptan |
| 3.00 | Benzoyl Peroxide |

Procedure:
All ingredients were charged and heated to reflux and maintained at reflux until conversion was complete. If necessary an additional amount of .3g benzoyl peroxide can be added to complete conversion.
Appearance
Emulsion
Constants
N.V. 50.5%
Viscosity 50 stokes With thorough agitation 100.0 g of the above emulsion was mixed with 27.0 g. 2-butanone (Dowanol EE Acetate could be used). The mixture became first very viscous and after thorough agitation became slightly viscous, while staying emulsified.

To 38.90 g. of this mixture the following were added:

| 1.28 g. | Toluene |
|---|---|
| 11.92 g. | Ethylene glycol ethyl ether |
| 1.59 g. | Acetone |
| 41.55 g. | EAB 381–2 at N.V. 23 % in 2-butanone (EAB 381–2 is cellulose acetate butyrate from Eastman Chemical Company.) |
| 5.66 g. | N-Butyl Cyclohexyl Phthalate |

A portion of the above mixture was cast with a 10 mil draw-down bar on a Bonderite steel panel. The wet film was allowed to dry for 10' and then was baked at 300° F for 30' (minutes).

The film was tough, of good mar resistance, flexible, and adhered excellently. The polymer composition showed good reflow properties and gloss. Wettability to pigments is excellent.

EXAMPLE XIII

Another example of producing lacquer type compositions again using a precursor follows:

A 98/2 copolymer of stearyl methacrylate (Az) was prepared in a hydrocarbon solvent. When the conversion was complete, a portion of the aziridinyl group was then esterified with acrylic acid (methacrylic acid could be used). The polymer thus had an unsaturated sidechain upon which other monomers were grafted.

| Formula: | |
|---|---|
| 1100.0 | V.M.&P. Naphtha |
| 686.0 | Stearyl Methacrylate |
| 14.0 | (A2) |
| 10.0 | Azobisisobutyronitrile (VAZO) |
| 100.0 | Isopropyl Acetate |
| 10.2 | Acrylic Acid |
| 0.4 | Hydroquinone |
| 5.0 | Isopropyl Acetate |

As seen, the amount of compound (Az) was reduced and hydroxypropyl methacrylate was eliminated. The rest of the polymerization procedure was the same as in Example XII To prepare the final grafted copolymer Example XII was followed using:

| Formula: | |
|---|---|
| 173.00 | V.M. & P. Naphtha |
| 162.0 | Hexane |
| 100.0 | Polymer solution described in preceding paragraph |
| 198.0 | Butyl Methacrylate |
| 459.0 | Methyl Methacrylate |
| 6.6 | Acrylic Acid |
| 9.0 | t-Dodecyl mercaptan |
| 5.0 | Benzoyl Peroxide |

The resulting sidechain polymer was acrylic acid-butyl methacrylate-methyl methacrylate in proportions of 1/30/69.

The ratio of backbone polymer to sidechain polymer was 5/95.
Appearance: Emulsion
Constants: N.V. 65.0%
When the emulsion at 65% solids was diluted with methyl ethyl ketone to 50% solids it became collodial. At 45% solids it became crystal clear with viscosity of 35 stokes.

EXAMPLE XIV

Preparation of hydrosols

The 98/2 precursor of Example XII was used to prepare a final grafted copolymer using the procedure of Example X and using:

| Formula: | |
|---|---|
| 140.0 | V.M.&P. & P. Naphtha |
| 120.0 | Hexane |
| 100.0 | Polymer from Example XII |
| 198.0 | BMA |
| 419.0 | MMA |
| 46.2 | AA |
| 9.0 | 5-dodecyl mercaptan |
| 5.0 | Benzoyl Peroxide |

The resulting sidechain polymer was acrylic acid – butyl methacrylate -methyl methacrylate in the ratio 7/30/63 (the increased acrylic acid allows later neutralization of the polymer to improve water compatability).

The ratio of backbone polymer to sidechain polymer was 5/95.

This composition was then subjected to vacuum at 40° C to strip off the diluent. After about 2 hours the residue is a white powder of almost 100% solids.

| 100.0 g. | of the powdery polymer was dissolved in |
| 100.0 g. | Methyl ethyl ketone at 50° C. To the solution |
| 6.5 g. | diethanol amine was added and stirred thoroughly. Then, |
| 50.0 g. | water had been added and once the system was homogeneous, it was of colloidal appearance and viscosity was 36.2 stokes at 40 % total solids. The colloidal resin had an infinite tolerance in water and stability seemed best at pH 7.8. |

To the resin at 40% solids, some glycol ethyl ether was added to eliminate air bubble formation. Then, a 10 mil wet coating was cast on a steel panel and allowed to air dry for 20 minutes. The coating then was baked 20 minutes at 140° C.

Flexibility, adhesion and hardness of the coating was excellent. Solvent resistance was good as far as a lacquer is required.

EXAMPLE XV

Preparation of Thermosetting Colloids

The preparation of a colloidal resin involves three steps:

1. Preparation of a preformed graft stabilizer (EXAMPLE II).
2. Preparation of an NAD with e.g. the following monomers:

AA/HPA/MMA/BMA/BA//1.0/15.0/32.8/38.4/12.8

3. A portion of the diluent of the NAD is stripped off and substituted with a mixture of n-butanol and toluene.

The example below describes the preparation of the colloids in detail:

A non-aqueous dispersion of a copolymer is obtained by the dispersion copolymerization at 82° C of 14 parts of acrylic acid, 210 parts of hydroxypropyl acrylate, 458 parts of methyl methacrylate, 180 parts of butyl acrylate, 540 parts of butyl methacrylate in 750 parts of hexane and 518 parts of isooctane (Isopar E) in the presence of 147 parts of the preformed graft polymer solutions of Example II, 17 parts of n-octyl mercaptan and 8 parts of azobisisobutyronitrile.

Of the dispersion above 760 parts of diluent is stripped off at 100°–120° C bath temperature. Then at 110° bath temperature, a mixture of n-butanol and toluene is added. The final solvent and/or diluent composition should have the following summarized composition:

| Hydrocarbon mixture | N-butanol | toluene |
|---|---|---|
| 45 | 35–40 | 15–20 |

The hydrocarbon mixture is a mixture of hexane and isooctane which was left in the dispersion polymer. The solvent mixture is chosen to meet air pollution law legislations.

The colloidal polymer has a solids content of 55% and the product viscosity should not be higher than Z.

The hydrosols and colloids described herein differ from conventional dispersions in one respect; namely, particle size. Microscopic pictures show polymer particles present in a colloid and a typical non-aqueous dispersion (NAD), see, e.g. "Acrylic Hydrosols", *Journal of Paint Technology* 40, June 1968, Page 264.

The colloid particles have maximum diameters of about 0.05–0.1 micron while the diameter of the dispersion particles is between 0.1–0.4 micron. The very small size of the hydrosol and colloid particles leads to a translucent or semi-transparent appearance.

Emulsions and dispersions which have larger particles are of rather milky appearance.

The properties of the acrylic colloids point to applications in which solution acrylic polymers are now used. However, because the colloids contain polymers of higher molecular weights than solution polymers, chemical and mechanical properties can be improved.

To prove this statement an AA/HPA/MMA/BMA/BA copolymer at a ratio of 1/15/32.8/38.4/12.8 has been made in a
a. solution form,
b. colloidal form (the preparation of the colloidal resin is already described above),
c. non-aqueous dispersion form.

The solution and colloidal resin both contained a mixture of isooctane and/or hexane-n-butanol and toluene at the same ratio.

The three resins then were crosslinked with a commercially available melamine-formaldehyde condensate in isopropanol. The ratio between acrylic polymer and melamine resin was 70/30 based on total solids. Cast films on Bonderite steel panels were baked at 120° C (250° F) for 30 minutes. The results of the test are summarized in the following table.

| Type of Polymer | Solution | Colloid | NAD |
|---|---|---|---|
| Solvent and/or Diluent | Isopar E/ n-butanol & Toluene Mixture | Same as Solution Polymerization | Isopar E/ Hexane 54.0/46.0 |
| Specific Viscosity | 0.119 | 0.205 | 0.205 |
| Sward Hardness | 22 | 32 | 20 |
| Mar Resistance | Poor | Good | Fair |
| Impact Resistance inch/lb. | 20 | 22 | 10 |
| Adhesion | Fair | Good | Poor |
| Flexibility | Fair | Good | Poor |
| Toughness | Fair | Good | Poor |
| Solvent Resistance | Good | Very Good | Fair |

-continued

| Type of Polymer | Solution | Colloid | NAD |
|---|---|---|---|
| Water Resistance | Fair | Good | Good |

The colloidal polymer has a higher molecular weight than the solution polymer and, therefore, the colloidal polymer gives harder films which are tougher and more flexible. The colloidal system is branched because it contains a graft copolymer and branching improves adhesion.

The NAD polymer contains rigid particles which if no plasticizer is added do not flow together properly at 120° C baking temperature. The butanol which the colloid contains functions as a plasticizer and, therefore, the polymer forms a continuous film at room temperature. Upon baking, however, the butanol escapes and does not interfere in film properties.

It was also found that (Az) in the backbone polymer which is used as a stabilizer to make the dispersion improves adhesion. When (Az) is substituted with glycidyl methacrylate the adhesion decreases.

What is claimed is:

1. The method of making a coating composition comprising a stabilized vinyl polymer in dispersion form comprising the steps of
   A. Forming an acrylic-graft copolymer stabilizer by
      A1. free radical solution polymerization of at least one fatty acrylic or methacrylic monomer containing 8–22 carbon atoms, and (2-(1-aziridinyl)-ethylmethacrylate to form a backbone in an organic medium which solvates the polymer; and
      A2. opening the aziridinyl ring by addition of a proton donating or proton accepting polymerizable monomer; and
      A3. grafting an insoluble sidechain onto the backbone resulting from A2.
   B. Copolymerizing vinyl monomers containing at least one of the monomers used in A3 in the presence of said stabilizer.

2. The method of claim 1 wherein A.3 and B are simultaneously accomplished by adding the vinyl monomers to the solution from A.2 and dispersion polymerizing the vinyl monomers while simultaneously grafting onto the stabilizer precursor obtained from solution polymerization in A.1.

3. The process of claim 2 wherein the mass ratio of the stabilizer precursor from step A.1 to the sidechains grafted thereon varies from 3:97 to 20:80.

4. The process of claim 1 wherein in step A.1 no catalyst or heat is used.

* * * * *